(12) United States Patent
Ito

(10) Patent No.: US 12,340,339 B2
(45) Date of Patent: Jun. 24, 2025

(54) INFORMATION PROCESSING APPARATUS, INFORMATION PROCESSING METHOD, AND INFORMATION PROCESSING PROGRAM

(71) Applicant: FUJITSU LIMITED, Kawasaki (JP)

(72) Inventor: Yuto Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 161 days.

(21) Appl. No.: 17/738,048

(22) Filed: May 6, 2022

(65) Prior Publication Data

US 2022/0391841 A1 Dec. 8, 2022

(30) Foreign Application Priority Data

Jun. 3, 2021 (JP) .................................. 2021-093809

(51) Int. Cl.
*G06Q 10/0835* (2023.01)
*G06Q 10/047* (2023.01)

(52) U.S. Cl.
CPC ..... *G06Q 10/08355* (2013.01); *G06Q 10/047* (2013.01)

(58) Field of Classification Search
CPC ........................ G06Q 10/08355; G06Q 10/047
(Continued)

(56) References Cited

U.S. PATENT DOCUMENTS 6,418,398 B1 7/2002 Dueck et al.
2007/0282618 A1* 12/2007 Barahona ......... G06Q 10/08355
705/338

(Continued)

FOREIGN PATENT DOCUMENTS

JP 2017-033378 A 2/2017
JP 2020-057050 A 4/2020
WO WO-2020263177 A1 * 12/2020 ............. B24C 1/003

OTHER PUBLICATIONS

B. Chakraborty, T. Maeda and G. Chakraborty, "Multiobjective route selection for car navigation system using genetic algorithm," Proceedings of the 2005 IEEE Midnight-Summer Workshop on Soft Computing in Industrial Applications, 2005. SMCia/05., Espoo, Finland, 2005, pp. 190-195. (Year: 2005).*

(Continued)

*Primary Examiner* — Jeff Zimmerman
*Assistant Examiner* — Hunter Molnar
(74) *Attorney, Agent, or Firm* — Fujitsu Intellectual Property Center

(57) ABSTRACT

An apparatus includes a processor to generate routes for delivering packages in a vehicle routing problem, obtain a first optimum solution of the vehicle routing problem with respect to the routes, determine whether a difference between an objective function value of the first optimum solution and an objective function value of a second optimum solution is greater than or equal to a first threshold value, the second optimum solution being obtained for a linear relaxation problem of the vehicle routing problem, and remove routes for which a variable indicative of a corresponding route is less than or equal to a second threshold value in the second optimum solution, upon finding that the difference is greater than or equal to the first threshold value, wherein a processor generates new routes for delivering packages other than packages that are to be delivered by one or more routes which are left remaining.

19 Claims, 15 Drawing Sheets

(58) Field of Classification Search
USPC .......................................................... 705/338
See application file for complete search history.

(56) References Cited

U.S. PATENT DOCUMENTS

| | | |
|---|---|---|
| 2014/0046585 A1 | 2/2014 | Morris, IV et al. |
| 2016/0148136 A1* | 5/2016 | Ni .................... G06Q 10/06312 |
| | | 705/7.22 |
| 2018/0268371 A1* | 9/2018 | Van Hentenryck .......................... |
| | | G06Q 10/06315 |
| 2020/0082323 A1* | 3/2020 | Heise .................... G06Q 10/047 |
| 2020/0207266 A1* | 7/2020 | Morimura .............. B60Q 1/444 |
| 2021/0398157 A1* | 12/2021 | Aras ...................... G06Q 10/04 |

OTHER PUBLICATIONS

V. N. Kubil, D. V. Grinchenkov and V. A. Mokhov, "Measurement of Objective Functions Influence on Vehicle Routing Problems Solution," 2019 International Science and Technology Conference "EastConf", Vladivostok, Russia, 2019, pp. 1-6. (Year: 2019).*

Gelinas, Sylvie et al: "A new branching strategy for time constrained routing problems with application to backhauling", Annals of Operations Research, Jan. 1, 1995, pp. 91-109, XP055963525, Retrieved from the Internet: URL:https://link.springer.com/content/pdf/10.1007/BF02098283.pdf [retrieved on Sep. 21, 2022] *pp. 91-94*.

Extended European Search Report dated Oct. 4, 2022 for corresponding European Patent Application No. 22171571.7, 10 pages.

* cited by examiner

FIG.6

| | SUPPLY TO NODE N0 ($a_{0,r}$) | SUPPLY TO NODE N1 ($a_{1,r}$) | SUPPLY TO NODE N2 ($a_{2,r}$) | SUPPLY TO NODE N3 ($a_{3,r}$) | SUPPLY TO NODE N4 ($a_{4,r}$) | SUPPLY TO NODE N5 ($a_{5,r}$) | COST ($c_r$) |
|---|---|---|---|---|---|---|---|
| ROUTE R0 ($r=0$) | 1 | 1 | | | | | 1 |
| ROUTE R1 ($r=1$) | | | 1 | 1 | 1 | | 1 |
| ROUTE R2 ($r=2$) | | | | | | 1 | 1 |
| ROUTE R3 ($r=3$) | 1 | 1 | 1 | 1 | | 1 | 1 |
| ROUTE R4 ($r=4$) | | | | | 1 | 1 | 1 |

FIG.7

| | SUPPLY TO NODE N0 ($a_{0,r}$) | SUPPLY TO NODE N1 ($a_{1,r}$) | SUPPLY TO NODE N2 ($a_{2,r}$) | SUPPLY TO NODE N3 ($a_{3,r}$) | SUPPLY TO NODE N4 ($a_{4,r}$) | SUPPLY TO NODE N5 ($a_{5,r}$) | COST ($c_r$) |
|---|---|---|---|---|---|---|---|
| ROUTE R0 ($r = 0$) | 1 | 1 | | | | | 1 |
| ROUTE R1 ($r = 1$) | | | 1 | | 1 | | 1 |
| ROUTE R2 ($r = 2$) | | | 1 | 1 | | | 1 |
| ROUTE R3 ($r = 3$) | 1 | | | 1 | | 1 | 1 |
| ROUTE R4 ($r = 4$) | | 1 | | | 1 | 1 | 1 |
| ROUTE R5 ($r = 5$) | 1 | | | | | 1 | 1 |

FIG.8

| | SUPPLY TO NODE N0 ($a_{0,r}$) | SUPPLY TO NODE N1 ($a_{1,r}$) | SUPPLY TO NODE N2 ($a_{2,r}$) | SUPPLY TO NODE N3 ($a_{3,r}$) | SUPPLY TO NODE N4 ($a_{4,r}$) | SUPPLY TO NODE N5 ($a_{5,r}$) | COST ($c_r$) |
|---|---|---|---|---|---|---|---|
| ROUTE R0 ($r=0$) | 1 | | | | | | 1 |
| ROUTE R1 ($r=1$) | | 1 | | | | | 1 |
| ROUTE R2 ($r=2$) | | | 1 | | | | 1 |
| ROUTE R3 ($r=3$) | | | 1 | 1 | | | 1 |
| ROUTE R4 ($r=4$) | | 1 | | 1 | | | 1 |
| ROUTE R5 ($r=5$) | | | | | 1 | 1 | 1 |
| ROUTE R6 ($r=6$) | | 1 | 1 | | 1 | 1 | 1 |

FIG.9

| | SUPPLY TO NODE N0 ($a_{0,r}$) | SUPPLY TO NODE N1 ($a_{1,r}$) | SUPPLY TO NODE N2 ($a_{2,r}$) | SUPPLY TO NODE N3 ($a_{3,r}$) | SUPPLY TO NODE N4 ($a_{4,r}$) | SUPPLY TO NODE N5 ($a_{5,r}$) | COST ($c_r$) |
|---|---|---|---|---|---|---|---|
| ROUTE R0 ($r=0$) | 1 | 1 | | | | | 1 |
| ROUTE R1 ($r=1$) | | | 1 | | 1 | | 1 |
| ROUTE R2 ($r=2$) | | | 1 | 1 | | | 1 |
| ROUTE R3 ($r=3$) | 1 | | | 1 | | | 1 |
| ROUTE R4 ($r=4$) | | 1 | 1 | | | 1 | 1 |
| ROUTE R5 ($r=5$) | 1 | 1 | | | | 1 | 1 |
| ROUTE R6 ($r=6$) | 1 | | | | 1 | 1 | 1 |
| ROUTE R7 ($r=7$) | 1 | | | 1 | 1 | | 1 |

FIG.10

| | SUPPLY TO NODE N0 ($a_{0,r}$) | SUPPLY TO NODE N1 ($a_{1,r}$) | SUPPLY TO NODE N2 ($a_{2,r}$) | SUPPLY TO NODE N3 ($a_{3,r}$) | SUPPLY TO NODE N4 ($a_{4,r}$) | SUPPLY TO NODE N5 ($a_{5,r}$) | COST ($c_r$) |
|---|---|---|---|---|---|---|---|
| ROUTE R0 ($r=0$) | 1 | | | | | | 1 |
| ROUTE R1 ($r=1$) | | 1 | | | | | 1 |
| ROUTE R2 ($r=2$) | | | 1 | | | | 1 |
| ROUTE R3 ($r=3$) | | | | 1 | | | 1 |
| ROUTE R4 ($r=4$) | | | | | 1 | | 1 |
| ROUTE R5 ($r=5$) | | | | | | 1 | 1 |
| ROUTE R6 ($r=6$) | | 1 | 1 | | | | 1 |
| ROUTE R7 ($r=7$) | | | | 1 | 1 | | 1 |
| ROUTE R8 ($r=8$) | | 1 | | | 1 | 1 | 1 |

FIG. 11

| | SUPPLY TO NODE N0 ($a_{0,r}$) | SUPPLY TO NODE N1 ($a_{1,r}$) | SUPPLY TO NODE N2 ($a_{2,r}$) | SUPPLY TO NODE N3 ($a_{3,r}$) | SUPPLY TO NODE N4 ($a_{4,r}$) | SUPPLY TO NODE N5 ($a_{5,r}$) | COST ($c_r$) |
|---|---|---|---|---|---|---|---|
| ROUTE R0 ($r=0$) | 1 | | | | | | 1 |
| ROUTE R1 ($r=1$) | | 1 | | | | | 1 |
| ROUTE R2 ($r=2$) | | | 1 | | | | 1 |
| ROUTE R3 ($r=3$) | 1 | | 1 | | | | 1 |
| ROUTE R4 ($r=4$) | | 1 | | 1 | | | 1 |
| ROUTE R5 ($r=5$) | 1 | | | | 1 | | 1 |
| ROUTE R6 ($r=6$) | | 1 | | | 1 | 1 | 1 |
| ROUTE R7 ($r=7$) | 1 | | | | 1 | 1 | 1 |
| ROUTE R8 ($r=8$) | 1 | | | 1 | | 1 | 1 |
| ROUTE R9 ($r=9$) | 1 | | | 1 | | 1 | 1 |

FIG.12

| | SUPPLY TO NODE N1 ($S_{r,1}$) | SUPPLY TO NODE N2 ($S_{r,2}$) | SUPPLY TO NODE N3 ($S_{r,3}$) | COST ($c_r$) |
|---|---|---|---|---|
| ROUTE R1 ($r = 1$) | 1 (kg) | 0.5 (kg) | | 1 |
| ROUTE R2 ($r = 2$) | | 1 (kg) | 0.5 (kg) | 1 |
| ROUTE R3 ($r = 3$) | 0.5 (kg) | | 1 (kg) | 1 |

FIG.13

| | SUPPLY TO NODE N1 ($S_{r,1}$) | SUPPLY TO NODE N2 ($S_{r,2}$) | SUPPLY TO NODE N3 ($S_{r,3}$) | COST ($c_r$) |
|---|---|---|---|---|
| ROUTE R1 ($r = 1$) | 1 | 0.5 | | 1 |
| ROUTE R2 ($r = 2$) | | 0.5 | 1 | 1 |

FIG.14

| | SUPPLY TO NODE N1 ($S_{r,1}$) | SUPPLY TO NODE N2 ($S_{r,2}$) | SUPPLY TO NODE N3 ($S_{r,3}$) | COST ($c_r$) |
|---|---|---|---|---|
| ROUTE R1 ($r = 1$) | 1 | 0.5 | | 1 |
| ROUTE R2 ($r = 2$) | | 1 | 0.5 | 1 |
| ROUTE R3 ($r = 3$) | 0.5 | | 1 | 1 |

FIG.15

| | SUPPLY TO NODE N1 ($S_{r,1}$) | SUPPLY TO NODE N2 ($S_{r,2}$) | SUPPLY TO NODE N3 ($S_{r,3}$) | COST ($c_r$) |
|---|---|---|---|---|
| ROUTE R4 ($r = 4$) | 0.5 | 1 | 1 | 1 |

INFORMATION PROCESSING APPARATUS, INFORMATION PROCESSING METHOD, AND INFORMATION PROCESSING PROGRAM

CROSS-REFERENCE TO RELATED APPLICATIONS

The present application is based upon and claims the benefit of priority from the prior Japanese Patent Application No. 2021-093809 filed on Jun. 3, 2021, with the Japanese Patent Office, the entire contents of which are incorporated herein by reference.

FIELD

The disclosures herein relate to information processing apparatuses, information processing methods, and information processing programs.

BACKGROUND

The vehicle routing problem is a problem in combinatorial optimization. A plurality of vehicles can use a plurality of routes each including a delivery center as a start point, a customer location as a node to visit, and the delivery center as a return point, thereby delivering packages from the delivery center to each node or from each node to the delivery center. Data defining the problem may be the number of nodes, the time required to travel between nodes on the vehicle, the quantity of packages (demand) to be delivered, the time period during which a vehicle is allowed to visit each node, the maximum load capacity of each vehicle, the cost incurred for each operating vehicle, and the like. When these data are given, an optimum solution in a vehicle routing problem is obtained by finding the routes of vehicles that minimize the sum of costs of delivery by use of the vehicles (i.e., the total delivery cost).

The optimization process for obtaining an optimum solution in a vehicle routing problem is a combinatorial optimization, for which an optimum solution is hard to find within a practically feasible computational time. As a method for efficiently solving a vehicle routing problem, proper routes for delivery purposes may be selected in advance to avoid considering all the possible routes in an optimization process. Then, an optimum set of routes may be selected from among the selected proper routes by an optimization process. When selecting the proper routes for delivery purposes, it is preferable to select, ahead of others, the routes than have some likelihood of constituting an optimum solution among all possible routes, i.e., the routes that have some likelihood of being actually used. If unfavorable routes are selected on the other hand, the resultant solution obtained by optimization will be a low-quality solution.

RELATED-ART DOCUMENTS

Patent Document

[Patent Document 1] Japanese Laid-open Patent Publication No. 2020-057050
[Patent Document 2] Japanese Laid-open Patent Publication No. 2017-033378

SUMMARY

According to an aspect of the embodiment, an information processing apparatus includes a memory and one or more processors coupled to the memory and configured to generate a plurality of routes for delivering packages in a vehicle routing problem, obtain a first optimum solution of the vehicle routing problem with respect to the plurality of routes, determine whether a difference between an objective function value of the first optimum solution and an objective function value of a second optimum solution is greater than or equal to a first threshold value, the second optimum solution being obtained for a linear relaxation problem of the vehicle routing problem with respect to the plurality of routes, and remove, from among the plurality of routes, one or more routes for which a variable indicative of a choice of a corresponding route is less than or equal to a second threshold value in the second optimum solution, upon finding that the difference is greater than or equal to the first threshold value, wherein the one or more processors generate one or more new routes for delivering packages other than packages that are to be delivered by one or more routes which are left remaining, among the plurality of routes, without being removed.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 6 is a drawing illustrating an example of a set of routes generated by initial route generation;
FIG. 7 is a drawing illustrating an example of a set of routes obtained by adding route R5;
FIG. 8 is a drawing illustrating an example of a set of routes obtained by adding route R6;
FIG. 9 is a drawing illustrating an example of a set of routes obtained by adding route R7;
FIG. 10 is a drawing illustrating an example of a set of routes obtained by adding route R8;
FIG. 11 is a drawing illustrating an example of a set of routes obtained by adding route R9;
FIG. 12 is a drawing illustrating an example of a set of routes generated by the route generation process;
FIG. 13 is a drawing illustrating an example of a preferred subset of routes subject to an integer programming problem;
FIG. 14 is a drawing illustrating an example of a set of routes generated by the route generation process;
and
FIG. 15 is a drawing illustrating an example of a route added by the route generation process.

DESCRIPTION OF EMBODIMENTS

In the following, embodiments of the invention will be described with reference to the accompanying drawings.

Figure 1:
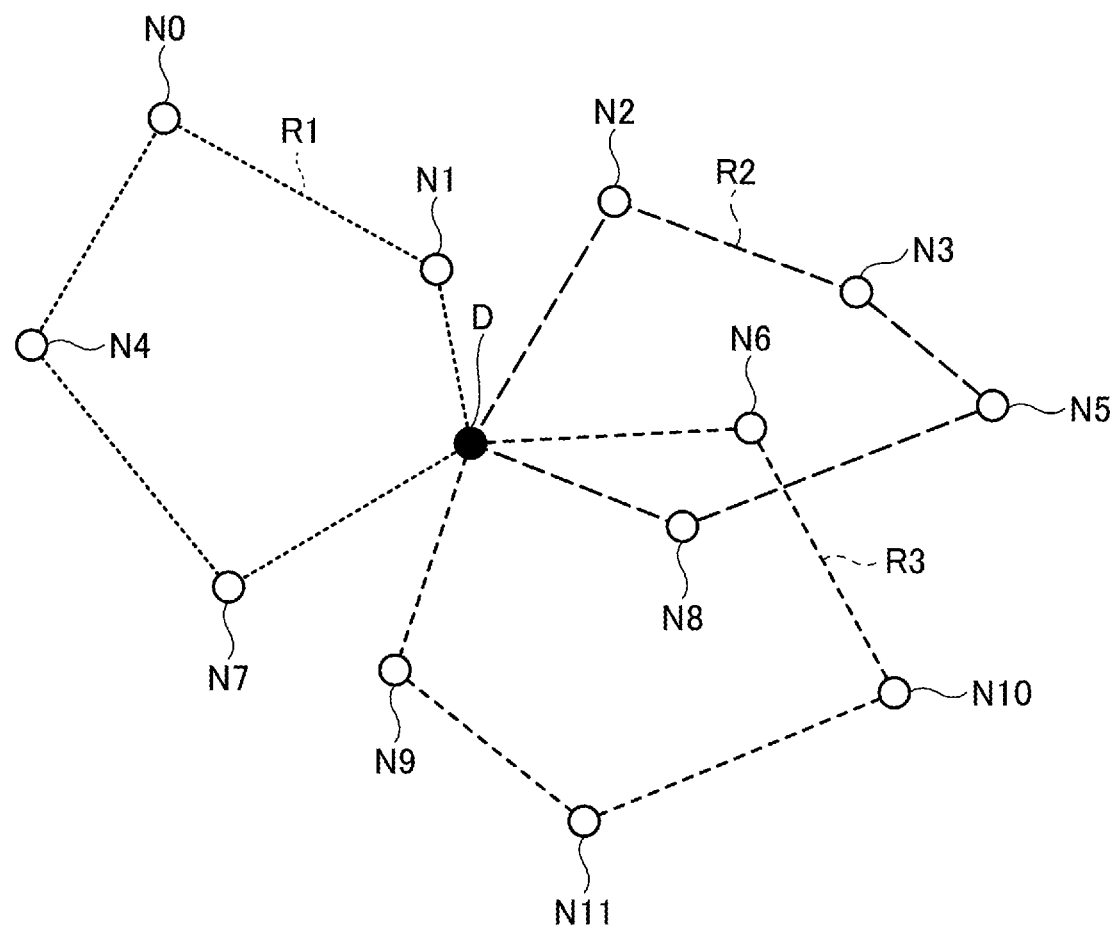
FIG. 1 is a schematic drawing illustrating an example of a vehicle routing problem.

FIG. 1 is a schematic drawing illustrating an example of a vehicle routing problem. In the vehicle routing problem illustrated in FIG. 1, 12 nodes N0 through N11 and a delivery center D are defined. A plurality of vehicles can use a plurality of routes each including the delivery center D as a start point, one or more nodes to visit, and the delivery center D as a return point, thereby delivering packages from the delivery center to each node or from each node to the delivery center. In the example illustrated in FIG. 1, the first vehicle delivers packages to nodes N0, N1, N4, and N7 via a route R1, and the second vehicle delivers packages to nodes N2, N3, N5, and N8 via a route R2. In addition, a third vehicle delivers packages to nodes N6, N9, N10 and N11 via a route R3. These three routes R1 through R3 may be a set of optimum routes determined by the optimization process that minimizes an objective function value (i.e., delivery cost).

The delivery cost may be, for example, the total travel distance covered by the vehicles during the delivery, or may be determined based on a fixed cost per vehicle that is incurred for the use of one vehicle regardless of its travel distance, for example. As a constraint, a maximum load limit may be defined for each vehicle, for example. Further, a time zone during which visits can be made may be defined for each node, for example. Constraints are not limited to these examples, and any conditions that need to be taken into account in vehicle routing may be used.

Even with the relatively small number of nodes, i.e., 12, as illustrated in FIG. 1, the number of all possible routes is very large. When such a large number of routes need to be taken into consideration, it is difficult to determine an optimum combination of routes in a short time using an optimization process. In consideration of this, all the possible routes (i.e., a set comprised of all routes) are not subjected to optimization, but a relatively small number of routes (i.e., a subset comprised of proper routes) that are selectively generated as proper routes for delivery purposes are subjected to optimization.

For example, a route that visits node N5, node N4, node N1, and node N2 in this order after starting from the delivery center D and then returns to the delivery center D is considered to be an improper route that is unlikely to be used in the case of the delivery cost being a total travel distance. Further, a route that visits node N1 after starting from the delivery center D and then immediately returns to the delivery center D, for example, is considered to be an improper route that is unlikely to be used in the case of the delivery cost being based on a fixed cost per vehicle. In this manner, all the possible routes include improper routes that are unlikely to be used. It is thus preferable to select routes that contribute to reducing the delivery cost (i.e., the objective function value) as much as possible while eliminating such improper routes to the maximum extent possible.

The information processing apparatus and the information processing method described below in the present disclosures generate proper routes as the routes constituting a subset that is subjected to optimization in a vehicle routing problem.

Figure 2:
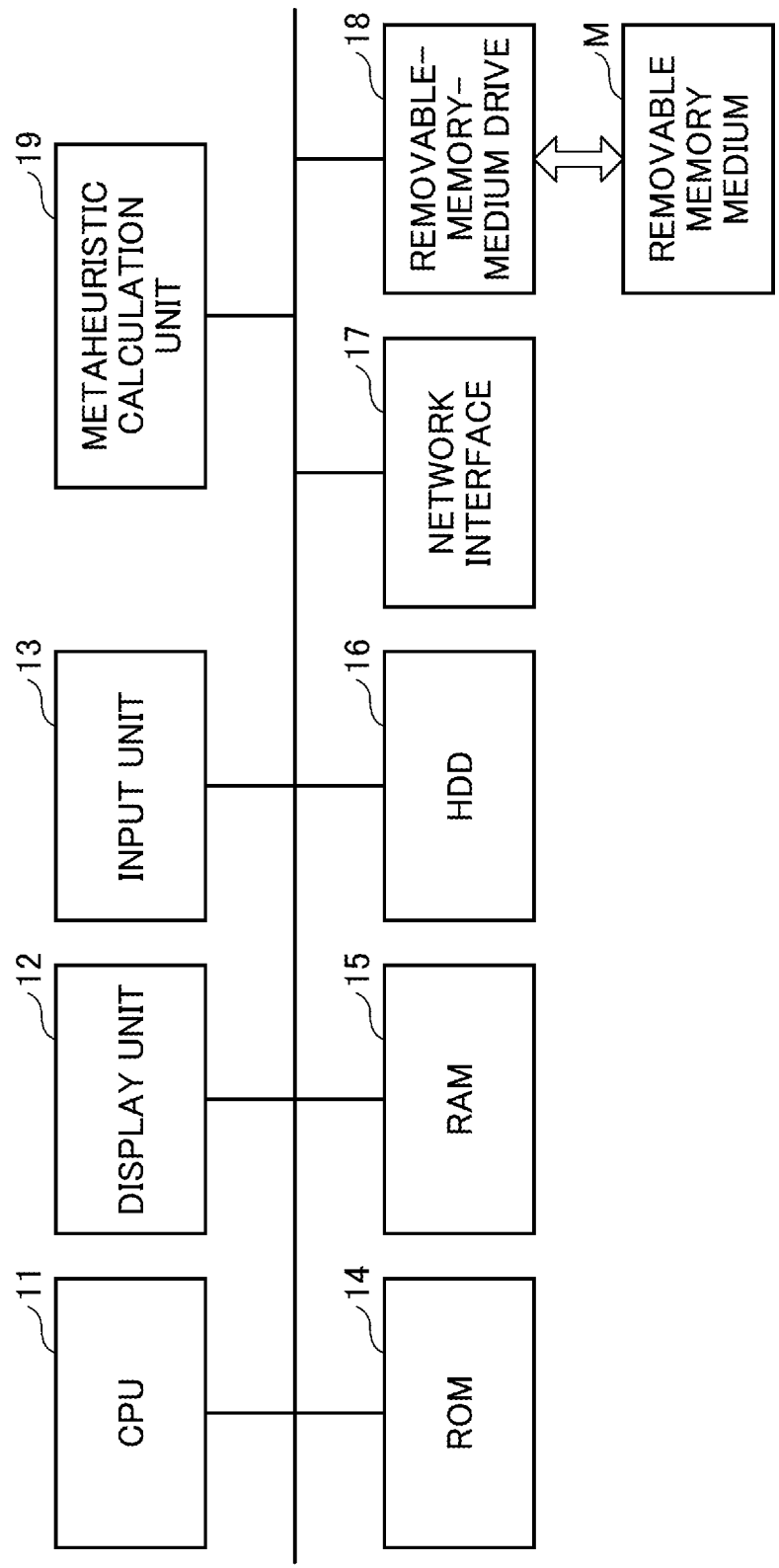
FIG. 2 is a drawing illustrating an example of the hardware configuration of an information processing apparatus.

FIG. 2 is a drawing illustrating an example of the hardware configuration of the information processing apparatus. The information processing apparatus illustrated in FIG. 2 includes a CPU 11, a display unit 12, an input unit 13, a ROM 14, a RAM 15, an HDD 16, a network interface 17, a removable-memory-medium drive 18, and a metaheuristic calculation unit 19.

The input unit 13 provides user interface, and receives various commands for operating the information processing apparatus and user responses responding to data requests or the like. The display unit 12 displays the results of processing by the information processing apparatus, and further displays various data that make it possible for a user to communicate with the information processing apparatus. The network interface 17 is used to communicates with peripheral devices and with remote locations.

The information processing apparatus illustrated in FIG. 2 is a computer, and the information processing method is provided as a computer program executable by the information processing apparatus. This computer program is stored in a memory medium M that is mountable to the removable-memory-medium drive 18. The computer program is loaded to the RAM 15 or to the HDD 16 from the memory medium M through the removable-memory-medium drive 18. Alternatively, the computer program may be stored in a memory medium (not shown) provided in a peripheral apparatus or at a remote location, and is loaded to the RAM 15 or to the HDD 16 from the memory medium through the network interface 17.

Upon receiving user instruction for program execution from the input unit 13, the CPU 11 loads the program to the RAM 15 from the memory medium M, the peripheral apparatus, the remote memory medium, or the HDD 16. The CPU 11 executes the program loaded to the RAM 15 by use of an available memory space of the RAM 15 as a work area, and continues processing while communicating with the user as such a need arises. The ROM 14 stores control programs for the purpose of controlling basic operations of the information processing apparatus. By executing the computer program as described above, the information processing apparatus performs the function to generate proper routes with respect to a vehicle routing problem.

The metaheuristic calculation unit 19 may be a dedicated hardware specifically designed to execute a metaheuristic algorithm, and may be a dedicated hardware that performs simulated annealing to search for a solution of an Ising problem. In an alternative configuration, the metaheuristic calculation unit 19 may not be provided. In such a case, the CPU 11, which is the processor of the general-purpose computer, functions as a metaheuristic calculation unit to perform a metaheuristic algorithm. The metaheuristic algorithm may be simulated annealing, a random walk search algorithm, a genetic algorithm, a stochastic evolution algorithm, taboo search, or the like. It suffices for a metaheuristic algorithm to search in a heuristic manner for a solution (i.e., approximate solution) approximate to the solution that minimizes an objective function.

By executing the computer program as described above, the information processing apparatus performs the function to generate proper routes for optimization purposes in a vehicle routing problem. The information processing apparatus may further perform optimization with respect to the generated routes to find an optimum solution (quasi-optimum solution to be exact (i.e., approximate optimum solution)) for the vehicle routing problem. As will be described later, the metaheuristic algorithm is used in a route generation process to generate routes and also in the optimization process that is performed with respect to the finalized routes.

Figure 3:
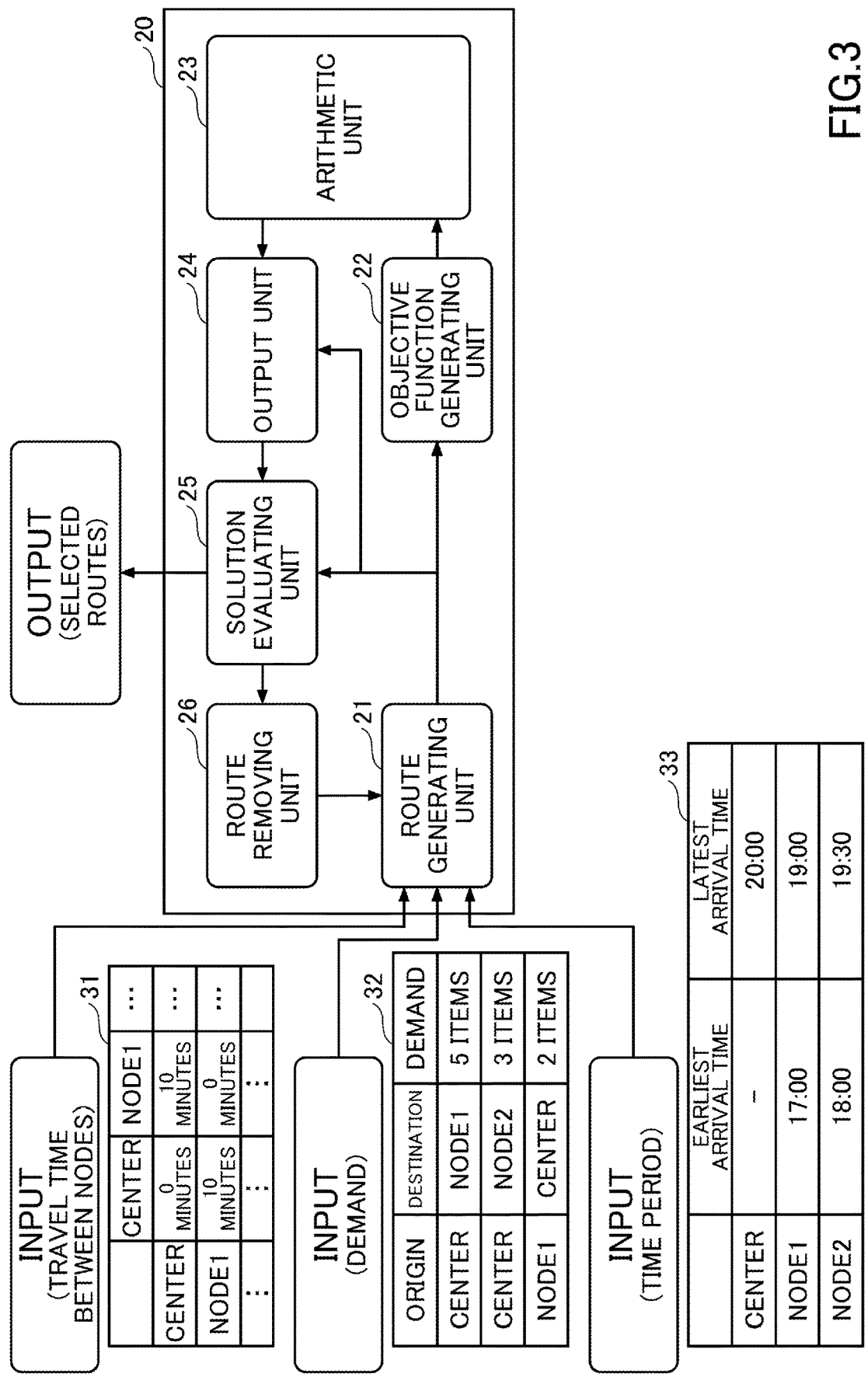
FIG. 3 is a drawing illustrating an example of the functional configuration of the information processing apparatus.

FIG. 3 is a drawing illustrating an example of the functional configuration of the information processing apparatus. An information processing apparatus 20 illustrated in FIG. 3 includes a route generating unit 21, an objective function generating unit 22, an arithmetic unit 23, an output unit 24, a solution evaluating unit 25, and a route removing unit 26. The route generating unit 21, the objective function generating unit 22, the output unit 24, the solution evaluating unit 25, and the route removing unit 26 may be implemented by the CPU 11 illustrated in FIG. 2. The arithmetic unit 23 may be implemented by the CPU 11 or the metaheuristic calculation unit 19.

It may be noted that boundaries between functional blocks illustrated as boxes indicate functional boundaries, and may not necessarily correspond to boundaries between program modules or separation in terms of control logic. One functional block and another functional block may be combined into one functional block that functions as one block. One functional block may be divided into a plurality of functional blocks that operate in coordination.

The route generating unit 21 may receive, as input, the data defining a vehicle routing problem, such as the number of nodes, the travel time required by a vehicle between nodes, the quantity of packages to be delivered (i.e., demand), the time period during which each node can be visited by a vehicle, the maximum load limit of each vehicle, and the delivery cost of each vehicle, and the like. In the example illustrated in FIG. 3, the received data include data 31 indicative of the travel time between nodes required by a vehicle, data 32 indicative of the quantity of packages that need to be delivered from the origin (i.e., the delivery center) to the destination (i.e., a node), and data 33 indicative of the time period during which each node can be visited.

The route generating unit 21 generates a plurality of routes R1 through Rn for delivering packages in a vehicle routing problem by use of a route generation process comprised of initial route generation and column generation based on the input data defining a vehicle routing problem. Initial route generation may be performed by use of any appropriate method, and may generate constraint satisfying routes by use of simple rules without regard to whether the routes are proper. Column generation involves adding a route that reduces an objective function value of a dual problem (i.e., an approximation value of the objective function of the vehicle routing problem) based on information obtained by solving the dual problem of a linear relaxation problem obtained by the linear relaxation of a vehicle routing problem. The initial route generation and column generation will be described in more detail later. The data defining each route Rr (r=1 to n) generated by the route generating unit 21 may include data indicating one or more nodes to be visited in the route, the order of nodes visited between the start from the delivery center and the return to the delivery center, and the quantity of packages to be delivered from the delivery center to each node.

Based on the input data defining a vehicle routing problem, the objective function generating unit 22 generates an objective function to be minimized in a vehicle routing problem and constraints with respect to the routes R1 to Rn generated by the route generating unit 21. The objective function and constraints may be defined, for example, by the following formulas.

$$\sum_{r \in R} c_r x_r \quad (1)$$

$$\sum_{r \in R} S_{r,i} x_r \geq D_i \quad (2)$$

In the formulas (1) and (2), R denotes a set having the routes R1 through Rn as its elements, and the sum symbol $\Sigma$ represents the sum of all the routes belonging to the set R.

In the formula (1), $c_r$ (r=1 to n) is the delivery cost for the route Rr, and may be generated based on the data relating to the route Rr, the input data 31 indicative of the travel time required by a vehicle to move from node to node, and the data indicative of nodes to visit and the order of nodes to visit in each route Rr. Further, $x_r$ is a variable indicating the choice of the route Rr (i.e., a variable indicating whether the route is selected as the route to be used). Its value is 1 when the route is selected, and is 0 when the route is not selected. Formula (1) is the objective function. The value of this objective function represents the sum of delivery costs for all the selected routes.

In the formula (2), a variable $D_i$ is the demand at node Ni (i=0 to m), which is the quantity of packages required to be delivered to node Ni, and may be generated based on the input data 32 indicative of the quantity of packages required to be delivered from the origin to the node. A variable $S_{r,i}$ is the quantity of packages supplied via the route Rr to node Ni, and may be generated based on the data relating to the route Rr. Formula (2) represents a constraint on the supply and demand of packages defined for each node Ni (i=0 to m), indicating that the supply is more than the demand for a given node.

The arithmetic unit 23 obtains a first optimum solution to the vehicle routing problem for the plurality of routes R1 to Rn generated by the route generating unit 21. An optimum solution (i.e., quasi-optimum solution) in the vehicle routing problem is obtained by finding a set of routes that minimizes the objective function value specified in the formula (1) while satisfying the constraints specified in the formula (2). In so doing, the term on the left-hand side of the formula (2) is moved to the right-hand side, and, then, the sum of the terms on the right-hand side (the value required to be less than or equal to 0) is multiplied by a weighting factor, followed by adding the value multiplied by the weighting factor to the formula (1) to obtain an evaluation value. The arithmetic unit 23 may perform optimization by minimizing the evaluation value. The arithmetic unit 23 may use a metaheuristic algorithm to determine a set of routes that minimizes the evaluation value.

In the metaheuristic algorithm, a bit pattern $(x_1, x_2, \ldots, x_n)$ comprised of n variables $x_r$ having a value of 0 or 1 is regarded as a state at each point in time. A state transition may be made such that the evaluation value becomes stochastically smaller and smaller. In so doing, the weighting factor may be set to a sufficiently large value, which enables the obtainment of a set of routes that satisfy the constraints without exception. Alternatively, a state transition may be made by use of a metaheuristic algorithm such that the objective function value defined by the formula (1) becomes stochastically smaller and smaller, while always selecting, as a next state, a state that satisfies the constraints defined by the formula (2).

Formula (2) reflects only package deliveries from the delivery center to nodes. In order to factor in the delivery of packages from nodes to the delivery center, it suffices to generate variables each indicating the quantity of packages required to be delivered from a node to the delivery center and variables each indicating the quantity of packages delivered from a node to the delivery center in each route, followed by generating a formula indicative of constraints similar to the formula (2). The constraints defined in the formula (2) do not explicitly reflect the constraints imposed by the input data 33 indicating the time period during which each node can be visited. In order to satisfy the constraints on visitable time periods, the route generating unit 21 may always generate a route such that a node is visited only during the visitable time period in the generated route. Any additional requirements imposed in a vehicle routing problem may be factored in by adding constraints representing those requirements, by generating routes satisfying those constraints, or the like.

The first optimum solution generated by the arithmetic unit 23 may be represented by a bit pattern $(x_1, x_2, \ldots, x_n)$ comprised of n variables having a value of 0 or 1. The output unit 24 extracts, from the data indicative of routes generated by the route generating unit 21, data indicative of selected routes (i.e., the routes having the value of 1) represented by the bit pattern of the first optimum solution, followed by outputting the data indicative of the selected routes as the optimum solution. The data indicative of the routes selected as the optimum solution is supplied to the solution evaluating unit 25.

The solution evaluating unit 25 may determine the objective function value (i.e., the total delivery cost) of the first optimum solution based on the above-noted data indicative of the routes. The solution evaluating unit 25 further determines whether the difference between the objective function value of the first optimum solution and the objective function value of a second optimum solution is greater than or equal to a first threshold value. Here, the second optimum solution is the solution of a linear relaxation problem of the vehicle routing problem obtained with respect to the routes R1 to Rn generated by the route generating unit 21. The objective function value noted above corresponds to the delivery cost value defined in the formula (1) in the case of the vehicle routing problem defined by the formula (1) and the formula (2), for example. The objective function value of the second optimum solution may be determined by the solution evaluating unit 25 solving the linear relaxation problem, or may be determined by the route generating unit 21 solving the linear relaxation problem and supplying the obtained value to the solution evaluating unit 25.

In the present application, when YES or NO is determined based on the magnitude relationship between a given value and a threshold value, it does not matter whether the equality case is included in the YES side or included in the NO side. Namely, when the magnitude relationship between a given value and a threshold value is determined, the phrase "when the given value is greater than or equal to the threshold value" may be construed to be equivalent to the phrase "when the given value is greater than the threshold value." Use of the phrase "greater than or equal to" as a criterion for determination is not intended to indicate that such a criterion is different from the criterion "greater than". The phrase "greater than or equal to" may properly be rephrased as "greater". The same applies in the case of "less than or equal to" and "less than".

The variable $x_r$, which specifies the vehicle routing problem, is a binary variable having a value of 0 or 1. The vehicle routing problem corresponds to an integer programming problem. The above-noted linear relaxation problem is a problem in which the possible value of the variable $x_r$ is allowed to be a real number value greater than or equal to zero, without being limited to integers. Except that the value range of the variable $x_r$ is relaxed, other conditions, such as constraints, are the same for both the linear relaxation problem and the original vehicle routing problem. The linear relaxation problem of a vehicle routing problem is a linear programming problem. An optimum solution for a linear programming problem can be derived by using a linear programming solver or the like that solves a linear programming problem using a simplex method, an interior point method, or the like. The linear relaxation problem will be described in more detail later.

When the difference previously noted is greater than or equal to the first threshold value, the route removing unit 26 removes, from among the routes R1 to Rn generated by the route generating unit 21, a route for which the variable $x_r$ indicative of the choice of the route is less than or equal to a second threshold value in the second optimum solution. The routes R1 to Rn originally generated by the route generating unit 21 may include a number of improper routes that are unlikely to be used in a quasi-optimum solution having a sufficiently high quality. In such a case, the first optimum solution obtained by the arithmetic unit 23 for the routes R1 to Rn may not be a sufficiently high quality quasi-optimum solution (i.e., may be a solution that is far from the true optimum solution). When the difference between the objective function value of the first optimum solution and the objective function value of the second optimum solution is greater than or equal to the first threshold value, it is reasonable to determine that the quality of the first optimum solution is not sufficiently high. In this case, the route removing unit 26 removes a route for which the variable $x_r$ is less than or equal to the second threshold value in the second optimum solution. With this arrangement, a route that is unlikely to be selected in a high quality quasi-optimum solution is removed from among the routes R1 to Rn originally generated by the route generating unit 21, thereby leaving the routes that have some likelihood of being selected in a high quality quasi-optimum solution.

Since the ranges of values of variables differ between a vehicle routing problem and a linear relaxation problem, the objective function values of an optimum solution also generally differ. The objective function value corresponding to the first optimum solution of a vehicle routing problem is greater than or equal to the objective function value corresponding to the second optimum solution of a linear relaxation problem. In order for the route generating unit 21 to generate the routes R1 to Rn, column generation is utilized in which the objective function value of a linear relaxation problem of a vehicle routing problem is used as an approximation value to the objective function value of the vehicle routing problem, and this approximation value is reduced for generating routes. When the objective function values of the first optimum solution and the second optimum solution differ by a significant margin, it is reasonable to determine that the routes R1 to Rn have been generated based on an optimum solution of the linear programming problem which differs greatly from an optimum solution that can be achieved by the variables $x_r$ taking a value of 0 or 1 (i.e., the optimum solution of the desired integer programming problem). In such a case, thus, improper routes are removed from the routes R1 to Rn, thereby leaving only proper routes that are proper for the purpose of being used in optimization for a vehicle routing problem.

In this case, a route for which the variable $x_r$ is less than or equal to the second threshold in the second optimum solution, i.e., a route for which the variable $x_r$ is 0.7, for example, contributes to an increase of $0.3c_r$ in the delivery cost upon being selected in the vehicle routing problem and thus being given a value of 1.0. On the other hand, a route for which the variable $x_r$ is 0.99 contributes to only an increase of $0.01c_r$ in the delivery cost upon being selected in the vehicle routing problem and thus being given a value of 1.0. Accordingly, the route with the variable $x_r$ being 0.7 is considered to be less proper than the route with the variable $x_r$ being 0.99 for the purpose of constituting an optimum solution in a vehicle routing problem, and is also considered to be less likely to be selected as a route that constitutes the optimum solution. In consideration of this, the second threshold value may be set to 0.9, for example, and all the routes for which the variable $x_r$ is 0.9 or less in the second optimum solution may be removed. This arrangement can select and retain only the routes that are proper for an optimum solution in a vehicle routing problem, i.e., the routs that are more likely to be chosen as proper routes in an optimum solution.

In other words, a route for which the variable $x_r$ is a small value such as 0.7 has some overlap with other routes in terms of the supply of packages, and is given a weighting factor such as 0.7 to be used in combination with other routes to constitute an optimum solution of a linear relaxation problem. Such a route can only constitute an optimum solution by being given a weighting factor such as 0.7, and is not a proper route for constituting an optimum solution that is achieved by the variables $x_r$ taking a value of 0 or 1 (i.e., the optimum solution of a desired integer programming problem).

Accordingly, removing all the routes for which the variable $x_r$ is less than or equal to 0.9 in the second optimum solution enables the removal of improper routes that are improper for the purpose of constituting an optimum solution in a vehicle routing problem.

The route generating unit 21 performs a route generation process substantially the same as before to generate new routes for delivering packages other than the packages that are to be delivered by the one or more routes which are left to remain, among the routes R1 to Rn, without being removed. Namely, the routes remaining without being removed among the routes R1 to Rn are determined to be part of the final routes belonging to a subset of routes subject to optimization, and the packages delivered by these finalized routes are removed from the packages to be delivered. With respect to the packages still remaining to be delivered, the route generating unit 21 generates new routes by using a route generation process comprised of initial route generation and column generation.

It is expected that a set of routes comprised of elements including the above-noted new routes and the previously determined routes will be more preferable as a subset for optimization than the routes R1 to Rn originally generated by the route generating unit 21. This is because, after retaining proper routes and removing all the other improper routes from among the routes generated by a predetermined route generation process, the new routes subsequently generated by the same route generation process are expected to include proper routes similarly to the first time. In other words, the set of routes that includes the new routes and the previously determined routes may include previously determined proper routes and subsequently generated new proper routes. Such a set of routes is expected to be more preferable than the initial set of routes (i.e., the routes R1 to Rn), which was comprised of routes determined to be proper and the other routes, all of which are improper routes.

In the manner described above, the information processing apparatus 20 illustrated in FIG. 3 generates proper routes for constituting a subset that is subject to optimization in a vehicle routing problem. Further, the solution search by the arithmetic unit 23, the difference-based determination by the solution evaluating unit 25, the route removal by the route removing unit 26, and the new route generation by the route generating unit 21 may be performed repeatedly while the difference remains to be greater than or equal to the first threshold value. In this manner, the process of removing routes and generating new routes is repeatedly performed until an optimum solution having a sufficiently high quality is obtained, thereby generating a subset with sufficiently high quality for optimization in a vehicle routing problem.

In the information processing apparatus 20 illustrated in FIG. 3, the arithmetic unit 23 may detect that the difference has become less than the first threshold value, and may then derive an optimum solution of the vehicle routing problem by using the routes that have been generated and left to remain. In other words, the information processing apparatus 20 may obtain a subset having sufficiently high quality for optimization in the vehicle routing problem, and may then perform optimization by using a metaheuristic algorithm with respect to the routes belonging to this subset to obtain an optimum solution for the vehicle routing problem. With this arrangement, the information processing apparatus 20 can obtain an optimum solution having sufficiently high quality (i.e., quasi-optimum solution).

It may be noted that during the route removal by the route removing unit 26, all of the routes may have the variable $x_r$ that is less than or equal to the second threshold value in the second optimum solution. In such a case, the route removing unit 26 may retain only one route having the maximum variable $x_r$ and remove all the other routes. This arrangement serves to avoid continuing to generate routes having similar quality in iterative calculations without successfully improving the quality of routes.

Figure 4:
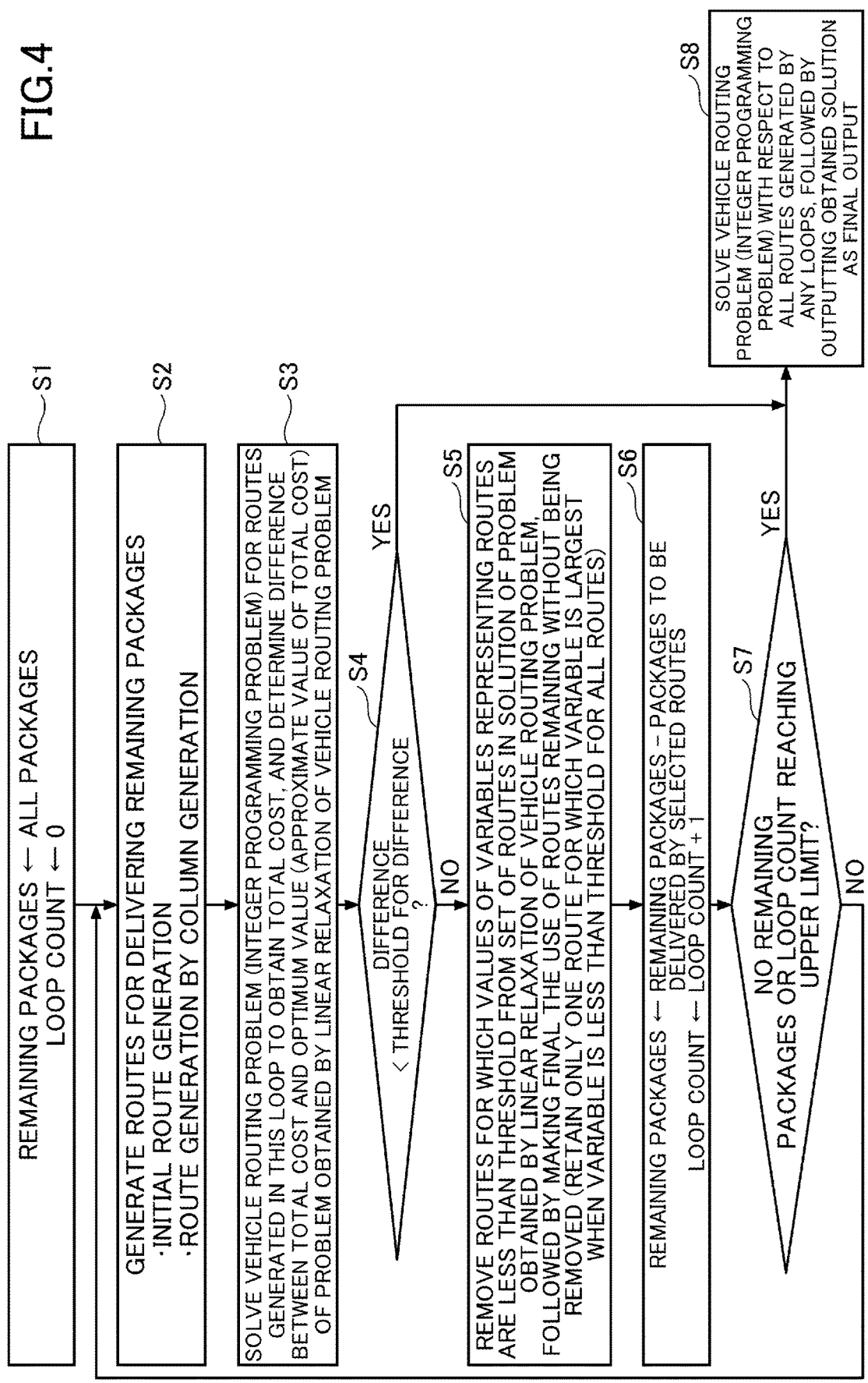
FIG. 4 is a flowchart illustrating the procedure of a route generation method performed by the information processing apparatus.

FIG. 4 is a flowchart illustrating the procedure of a route generation method performed by the information processing apparatus 20. It may be noted that, in FIG. 4 and the subsequent flowcharts, an order in which the steps illustrated in the flowchart are performed is only an example. The scope of the disclosed technology is not limited to the disclosed order. For example, a description may explain that an A step is performed before a B step is performed. Despite such a description, it may be physically and logically possible to perform the B step before the A step while it is possible to perform the A step before the B step. In such a case, all the consequences that affect the outcomes of the flowchart may be the same regardless of which step is performed first. It then follows that, for the purposes of the disclosed technology, it is apparent that the B step can be performed before the A step is performed. Despite the explanation that the A step is performed before the B step, such a description is not intended to place the obvious case as described above outside the scope of the disclosed technology. Such an obvious case inevitably falls within the scope of the technology intended by this disclosure.

In step S1 of FIG. 4, the information processing apparatus 20 sets all packages required to be delivered in a vehicle routing problem to "remaining packages" and initializes the variable indicative of a loop count to 0.

In step S2, the route generating unit 21 of the information processing apparatus 20 generates routes for delivering the remaining packages by use of a route generation process comprised of initial route generation and column generation. Initial route generation may be performed by use of any appropriate method, and may generate routes satisfying both constraints and demand by use of simple rules without regard to whether the routes are proper. Column generation involves adding a route that reduces an objective function value of a dual problem (i.e., an approximation value of the objective function of the vehicle routing problem) based on information obtained by solving the dual problem of a linear relaxation problem obtained by the linear relaxation of a vehicle routing problem. In the following, the route generation process performed by the route generating unit 21 will be described in detail.

Figure 5:
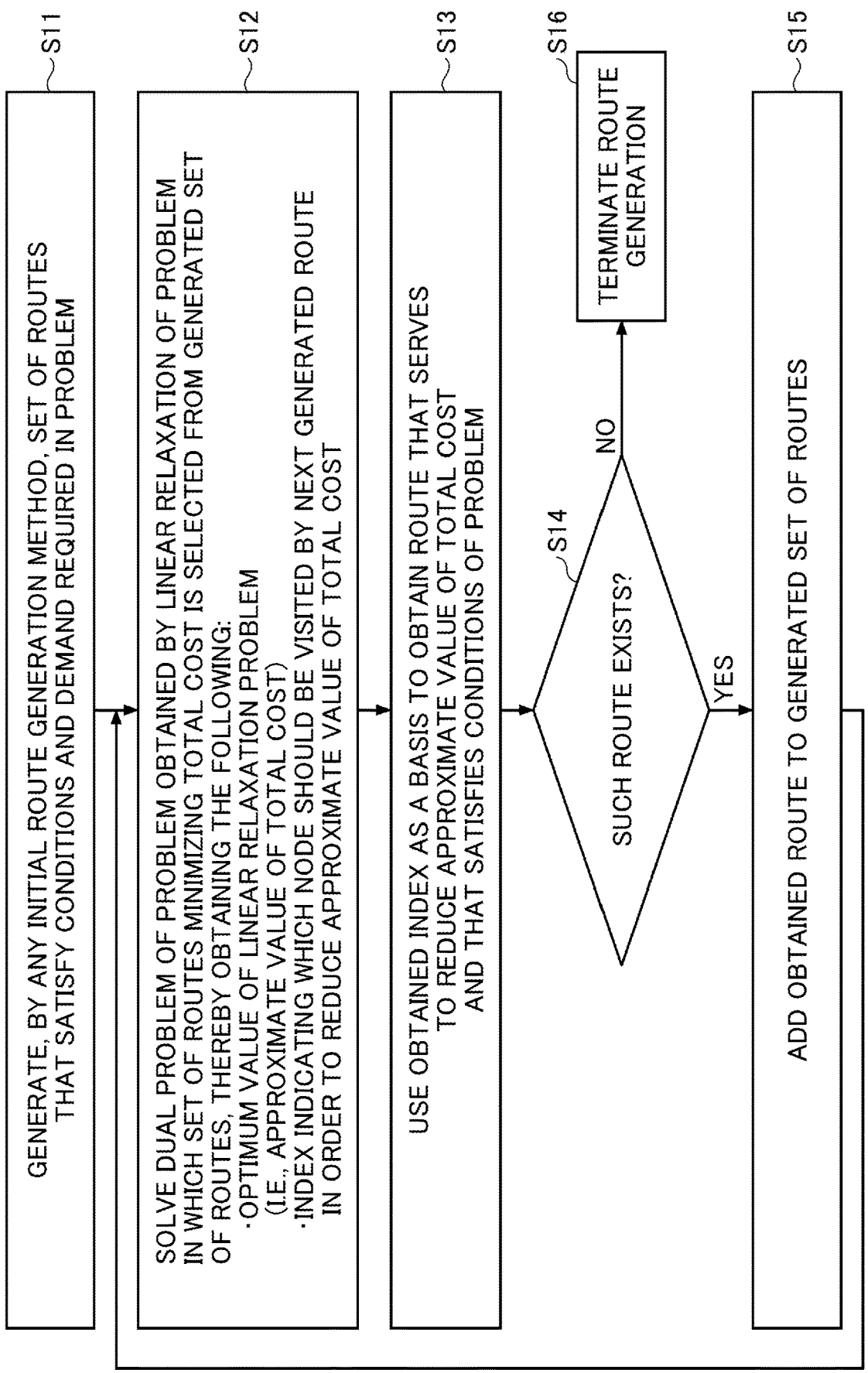
FIG. 5 is a flowchart illustrating the procedure of a route generation process performed by a route generating unit.

FIG. 5 is a flowchart illustrating the procedure of the route generation process performed by the route generating unit 21. In step S11, the route generating unit 21 generates, by any initial route generation method, a set of routes that satisfy the constraints and the demand required in the vehicle routing problem. At the time of initial route generation, the delivery cost does not matter, and the routes may be generated without regard to the delivery cost. As an example, the initial route generation may provide routes equal in number to the nodes, and design the routes such that only one node is visited in each route, and each route visits a different node.

In step S12, the route generating unit 21 solves the dual problem of a linear relaxation problem that is generated by the linear relaxation of a problem in which a set of routes minimizing the total delivery cost (e.g., the delivery cost defined in the above-described formula (1)) is selected from the set of generated routes. This arrangement produces an optimum value of the linear relaxation problem (i.e., an approximate value of the total delivery cost) and an index indicating which node the next generated route should visit in order to reduce the approximate value of the total delivery cost. In step S13, the route generating unit 21 uses the obtained index as a basis to obtain a route that serves to reduce the approximate value of the total delivery cost and that satisfies the conditions of the problem. In step S14, a check is made as to whether such a route exists. Upon finding that such a route does not exist, the route generation process comes to an end in step S16. Upon finding that such a route exists, the obtained route is added in step S15 to the set of previously generated routes. Thereafter, the procedure returns to step S12, from which the subsequent processes are repeated.

The procedure from step S12 through step S15 described above constitutes column generation. In the following, column generation will be described in more detail by using a simplified example. In this example, there are six nodes N0 to N5. The quantities of packages required to be delivered from the delivery center to nodes N0, N1, N2, N3, N4 and N5 are D0 (5 kg), D1 (4 kg), D2 (4 kg), D3 (3 kg), D4 (2 kg) and D5 (2 kg), respectively. The maximum load limit of each vehicle is 10 kg, and the cost of each vehicle is 1 (i.e., $c_r=1$ in the previously noted formula (1)). In addition, the rules are such that packages cannot be separately delivered to one node. Namely, a vehicle delivering packages to node N0 needs to carry all the packages totaling 5 kg.

FIG. 6 is a drawing illustrating an example of a set of routes generated by initial route generation. In this example, the initial route generation in step S11 illustrated in FIG. 5 produces five routes R0 to R4 as illustrated in the table in FIG. 6. In the table, "1" at the intersection between a row corresponding to a route and a column corresponding to a node indicates that this route is used to deliver packages to this node. For example, the route R0 is used to deliver packages to nodes N0 and N1. It may be noted that $a_{i,r}$ (i=0 to 5, r=0 to 4) illustrated in the table is a variable that assumes a value of 1 when packages are delivered to node Ni by use of the route Rr, and assumes a value of 0 when packages are not delivered to node Ni by use of the route Rr.

After the routes R0 to R4 illustrated in FIG. 6 are generated by the initial route generation, the dual problem of a linear relaxation problem of the vehicle routing problem is solved in step S12 illustrated in FIG. 5. The above-noted vehicle routing problem is defined by the following formulas.

$$\sum_r c_r x_r \quad (3)$$

$$\sum_r a_{i,r} x_r \geq 1 \quad (4)$$

It may be noted that in the vehicle routing problem used as an example, $c_r$ is equal to 1 for all the routes. The variable $x_r$ in the vehicle routing problem assumes either a value of 0 or a value of 1. An optimum solution in the vehicle routing problem is obtained by determining the variables $x_r$ having a value of 0 or 1 that minimize the objective function specified in the formula (3) while satisfying the constraints specified in the formula (4) for six nodes Ni (i=0 to 5). In the linear relaxation problem obtained by the linear relaxation of the vehicle routing problem, the variables $x_r$ appearing in the above formulas (3) and (4) assume a real-number value of 0 or more. An optimum solution in the linear relaxation problem of the vehicle routing problem is obtained by determining the variables $x_r$ having a value of 0 or more that minimize the objective function specified in the formula (3) while satisfying the constraints specified in the formula (4).

The dual problem of the above-noted linear relaxation problem is defined by the following formulas.

$$\sum_i y_i \quad (5)$$

$$\sum_i a_{i,r} y_i \leq c_r \quad (6)$$

It may be noted that $c_r$ is equal to 1 for all the routes. Further, $y_i$ (i=0 to 5) is a variable with a real-number value greater than or equal to 0. The dual problem is defined such that the variables $y_i$ that maximize the value of the formula (5) are obtained under the conditions that satisfy the formula (6) for each r (r=0 to 4).

This variable $y_i$ corresponds to the weight by which a respective one of the six constraints specified in the formula (4) (i.e., the constraints corresponding to six nodes Ni) is multiplied when creating a composite constraint as a sum of weighted six constraints. The formula (6) relates to the cost $c_r$ of each route, and corresponds to the condition that a finite optimum solution exists (i.e., the problem is bounded) when minimizing the original objective function (i.e., the objective function defined in the formula (3)) while satisfying the composite constraint. Maximizing the formula (5) is equivalent to obtaining the weights that give the most stringent composite constraint when minimizing the objective function defined in the formula (3). In other words, the dual problem of the linear relaxation problem corresponds to finding how much weight should be given to each constraint of the linear relaxation problem when constructing an optimum solution of the linear relaxation problem. The objective function value of the optimum solution of the linear relaxation problem (i.e., the value of the formula (3)) is equal to the objective function value of the optimum solution of the dual problem (i.e., the value of the formula (5)).

For the five routes R0 to R4 illustrated in FIG. 6, the optimum solution of the dual problem defined by the formulas (5) and (6) is $(y_0, y_1, y_2, y_3, y_4, y_5)=(1, 0, 0, 0, 1, 1)$. The optimum value in this case is 3. Such an optimum solution can be derived by using a linear programming solver or the like that solves a linear programming problem using a simplex method, an interior point method, or the like. The optimum solution of the dual problem, i.e., $(y_0, y_1, y_2, y_3, y_4, y_5)=(1, 0, 0, 0, 1, 1)$, can be used as an index for reducing the optimum value of the dual problem (i.e., an approximate value of the total delivery cost).

In step S13 illustrated in FIG. 5, the route generating unit 21 uses this index as a basis to obtain a route R5 that serves to reduce the approximate value of the total delivery cost and that satisfies the conditions of the problem. Specifically, a candidate for the route R5 is obtained by calculating the variables $a_{i,5}$ that maximize an objective function value of the formula (7) given below while satisfying conditions of the formula (8) given below.

$$\sum_i a_{i,5} y_i \qquad (7)$$

$$\sum_i a_{i,5} D_i \leq 10 \qquad (8)$$

Here, $y_i$ (i=0 to 5) appearing in the formula (7) is equal to the optimum dual problem solution, i.e., $(y_0, y_1, y_2, y_3, y_4, y_5)=(1, 0, 0, 0, 1, 1)$, but is used as a constant rather than a variable in the formula (7). The formula (8) corresponds to the constraint that the maximum load limit of one vehicle is 10 kg. By solving the linear programming problem defined in the formulas (7) and (8), $(a_{0,5}, a_{1,5}, a_{2,5}, a_{3,5}, a_{4,5}, a_{5,5})=(1, 0, 0, 0, 1, 1)$ is obtained as the optimum solution.

Obtaining this optimum solution is equivalent to obtaining, as a candidate for the route R5 to be newly added, a route that delivers packages to three locations, i.e., node N0, node N4, and node N5. Since this candidate for the route R5 is obtained by maximizing the formula (7), obtaining the candidate for the route R5 is equivalent to obtaining a route that is highly likely to cause the optimum solution of the dual problem to fail to satisfy the constraint of the formula (6) for the route R5. When the candidate for the route R5 is actually the route for which the constraint of the formula (6) is not satisfied, the candidate is properly added as a new route R5 in step S15 illustrated in FIG. 5. As a result, the aforementioned optimum solution of the dual problem, i.e., $(y_0, y_1, y_2, y_3, y_4, y_5)=(1, 0, 0, 0, 1, 1)$, becomes a set of variables $y_i$ that does not satisfy the new constraint specified by formula (6) for the route R5, and is thus no longer a set of variables that constitutes the optimum solution. When the dual problem is solved for the set of routes obtained by newly adding the route R5, thus, the optimum value of the objective function to be maximized (i.e., the value of the formula (5)) is restricted by tighter constraints than the previous ones, thereby becoming smaller than the previous optimum value. As was previously described, the optimum value of the objective function in the dual problem is equal to the optimum value of the objective function in the original linear relaxation problem. Because of this, adding the route R5 achieves the goal of reducing the optimum value of the linear relaxation problem (i.e., an approximate value of the total delivery cost).

Whether the candidate for the route R5 actually does not satisfy the constraint of the formula (6) is found by determining which one is greater, $c_r$ or $\sigma a_{1,5} y_i$. In the case of $c_r < \sigma a_{1,5} y_i$, the optimum value of the linear relaxation problem can be lowered because adding the candidate for the route R5 causes the constraints of the formula (6) to be not satisfied. In the case of $c_r \sigma a_{1,5} y_1$, the constraints of the formula (6) are satisfied even after adding the candidate for the route R5. Accordingly, in the case of $c_r \sigma a_{1,5} y_1$, the determination is made, in step S14 of FIG. 5, that a desired route does not exist, which results in the termination of the route generation process.

FIG. 7 is a drawing illustrating an example of a set of routes obtained by adding the route R5 as described above. For the six routes R0 to R5 illustrated in FIG. 7, the optimum solution of the dual problem defined by the formulas (5) and (6) is $(y_0, y_1, y_2, y_3, y_4, y_5)=(\frac{1}{3}, \frac{2}{3}, \frac{2}{3}, \frac{1}{3}, \frac{1}{3})$. The optimum value in this case is 2.33•••.

By solving the linear programming problem by using the variables $a_{i,6}$ instead of the variables $a_{i,5}$ in the formulas (7) and (8), $(a_{0,6}, a_{1,6}, a_{2,6}, a_{3,6}, a_{4,6}, a_{5,6})=(0, 1, 1, 0, 1, 0)$ is obtained as the optimum solution.

Obtaining this optimum solution is equivalent to obtaining, as a candidate for the route R6 to be newly added, a route that delivers packages to three locations, i.e., node N1, node N2, and node N4. Since $c_r < \sigma a_{1,6} y_i$ $(=\frac{2}{3}+\frac{2}{3}+\frac{1}{3})$, the candidate is added to the set of routes as a new route R6 in step S15 of FIG. 5. As a result, when the dual problem is solved for the set of routes obtained by newly adding the route R6, the optimum value of the objective function to be maximized (i.e., the value of the formula (5)) is restricted by tighter constraints than the previous ones, thereby becoming smaller than the previous optimum value. Adding the route R6 thus achieves the goal of reducing the optimum value of the linear relaxation problem (i.e., an approximate value of the total delivery cost).

FIG. 8 is a drawing illustrating an example of a set of routes obtained by adding the route R6 as described above. For the seven routes R0 to R6 illustrated in FIG. 8, the optimum solution of the dual problem defined by the formulas (5) and (6) is $(y_0, y_1, y_2, y_3, y_4, y_5)=(0.6, 0.4, 0.4, 0.4, 0.2, 0.2)$. The optimum value in this case is 2.2.

By solving the linear programming problem by using the variables $a_{i,7}$ instead of the variables $a_{i,5}$ in the formulas (7) and (8), $(a_{0,7}, a_{1,7}, a_{2,7}, a_{3,7}, a_{4,7}, a_{5,7})=(1, 0, 0, 1, 1, 0)$ is obtained as the optimum solution. Since $c_r < \sigma a_{1,7} y_i (=0.6+0.4+0.2)$, the candidate is added to the set of routes as a new route R7 in step S15 of FIG. 5.

FIG. 9 is a drawing illustrating an example of a set of routes obtained by adding the route R7 as described above. For the eight routes R0 to R7 illustrated in FIG. 9, the optimum solution of the dual problem defined by the formulas (5) and (6) is $(y_0, y_1, y_2, y_3, y_4, y_5)=(\frac{1}{2}, \frac{1}{3}, \frac{1}{2}, \frac{1}{3}, \frac{1}{6}, \frac{1}{3})$. The optimum value in this case is 2.166 •••.

By solving the linear programming problem by using the variables $a_{i,8}$ instead of the variables $a_{i,5}$ in the formulas (7) and (8), $(a_{0,8}, a_{1,8}, a_{2,8}, a_{3,8}, a_{4,8}, a_{5,8})=(0, 1, 1, 0, 0, 1)$ is obtained as the optimum solution. Since $c_r < \sigma a_{1,8} y_1$ $(=\frac{1}{3}+\frac{1}{2}+\frac{1}{3})$, the candidate is added to the set of routes as a new route R8 in step S15 of FIG. 5.

FIG. 10 is a drawing illustrating an example of a set of routes obtained by adding the route R8 as described above. For the nine routes R0 to R8 illustrated in FIG. 10, the optimum solution of the dual problem defined by the formulas (5) and (6) is $(y_0, y_1, y_2, y_3, y_4, y_5)=(\frac{1}{2}, 0, \frac{1}{2}, \frac{1}{2}, 0, \frac{1}{2})$. The optimum value in this case is 2.

By solving the linear programming problem by using the variables $a_{i,9}$ instead of the variables $a_{i,5}$ in the formulas (7) and (8), $(a_{0,9}, a_{1,9}, a_{2,9}, a_{3,9}, a_{4,9}, a_{5,9})=(1, 0, 0, 1, 0, 1)$ is obtained as the optimum solution. Since $c_r < \sigma a_{1,9} y_1 (=\frac{1}{2}+\frac{1}{2}+\frac{1}{2})$, the candidate is added to the set of routes as a new route R9 in step S15 of FIG. 5.

FIG. 11 is a drawing illustrating an example of a set of routes obtained by adding the route R9 as described above. For the ten routes R0 to R9 illustrated in FIG. 11, the optimum solution of the dual problem defined by the formulas (5) and (6) is $(y_0, y_1, y_2, y_3, y_4, y_5)=(\frac{1}{2}, \frac{1}{2}, \frac{1}{4}, \frac{1}{4}, \frac{1}{4}, \frac{1}{4})$. The optimum value in this case is 2.

By solving the linear programming problem by using the variables $a_{i,10}$ instead of the variables $a_{i,5}$ in the formulas (7) and (8), $(a_{0,10}, a_{1,10}, a_{2,10}, a_{3,10}, a_{4,10}, a_{5,10})=(1, 0, 0, 1, 0, 1)$ is obtained as the optimum solution. The condition, i.e., $c_r\sigma a_{1,10}y_i(=\frac{1}{2}+\frac{1}{4}+\frac{1}{4})$, indicates that even when the candidate is added to the set of routes as a new route R10 in step S15 of FIG. 5, the optimum solution of the linear relaxation problem (i.e., an approximate value of the total delivery cost) is not lowered. Accordingly, the determination is made that a desired route does not exist, which results in the termination of the route generation process in step S16 of FIG. 5.

As described above, through the route generation process illustrated in FIG. 5, the route generating unit 21 generates a plurality of routes. In other words, the route generation process (i.e., the initial route generation by the route generating unit 21 and the route generation by the column generation) in step S2 is completed in the route generation method illustrated in FIG. 4.

A set of routes generated in this manner is not an entire set containing all possible routes, but a subset containing part of all the possible routes. When a sufficient number of appropriate routes are not included in this subset, there may be a risk of failing to obtain an optimum solution having sufficiently high quality when the arithmetic unit 23 determines an optimum set of routes for this subset in order to solve the vehicle routing problem. The example considered here provides a situation in which 1 kg of packages need be delivered from the delivery center to each node when there are three nodes (i.e., $D_i=1$ in the previously-noted formula (2)). The maximum load limit of each vehicle is 1.5 kg, and the cost of each vehicle is 1 (i.e., $c_r=1$ in the previously noted formula (1)).

FIG. 12 is a drawing illustrating an example of a set of routes generated by the route generation process. In this example, the three routes illustrated in FIG. 12 are generated in step S2 of FIG. 4. In this case, solving the linear relaxation problem of the vehicle routing problem defined by the previously-noted formulas (1) and (2) gives the optimum solution $(x_1, x_2, x_3)=(\frac{2}{3}+\frac{2}{3}+\frac{1}{3})$, with the optimum value (i.e., an approximate value of the total delivery cost) being 2. Further, solving the vehicle routing problem (i.e., integer programing problem) gives the optimum solution $(x_1, x_2, x_3)=(1, 1, 1)$, with the optimum value (i.e., an approximate value of the total delivery cost) being 3. In this example, there is a large difference between the optimum value "2" of the linear relaxation problem and the optimum value "3" of the vehicle routing problem. The route for which the variable $x_r$ is a small value of $\frac{2}{3}$ has some overlap with other routes in terms of the supply of packages, and is given a weighting factor of $\frac{2}{3}$ to be used in combination with other routes to constitute the optimum solution of the linear relaxation problem. Such a route can only constitute an optimum solution by being given a weighting factor of $\frac{2}{3}$, and is not a proper route for constituting an optimum solution that is achieved by the variables $x_r$ taking a value of 0 or 1 (i.e., the optimum solution of a desired integer programming problem).

In step S2 illustrated in FIG. 4, column generation generates routes by minimizing an optimum value in the linear relaxation problem of the vehicle routing problem. Accordingly, the generated routes may possibly be routes that can only constitute an optimum solution by being given a weighting factor less than 1 as illustrated in the example of FIG. 12, and that are not proper for constituting an optimum solution of a desired integer programming problem. It is not preferable that such routes constitute a subset of routes subject to the integer programming problem.

FIG. 13 is a drawing illustrating an example of a preferred subset of routes subject to an integer programming problem. When the two routes illustrated in FIG. 13 are given, the optimum value of the linear relaxation problem of the vehicle routing problem is 2, and the optimum value of the vehicle routing problem (i.e., the integer programming problem) is also 2. In this case, there is no difference between the optimum value "2" of the linear relaxation problem and the optimum value "2" of the vehicle routing problem, so that the optimum solution obtained for the vehicle routing problem is expected to have sufficiently high quality. As can be understood from the description given above, the difference between the optimum value of the vehicle routing problem and the optimum value of the linear relaxation problem of the vehicle routing problem obtained for the generated subset of routes can be used to determine whether the routes included in the subset are proper routes.

Referring to FIG. 4 again, a further description will be given of the processes performed after the route generating unit 21 generates a plurality of routes in step S2.

In step S3, the information processing apparatus 20 solves the vehicle routing problem (i.e., the integer programming problem) for a plurality of routes to obtain the total delivery cost, and determines the difference between the total delivery cost and the optimum value (i.e., an approximate value of the total delivery cost) of the problem obtained by the linear relaxation of the vehicle routing problem. Specifically, the arithmetic unit 23 obtains a first optimum solution for the vehicle routing problem with respect to the plurality of routes generated in step S2, and the solution evaluating unit 25 derives the difference between the objective function value of the first optimum solution and the objective function value of a second optimum solution obtained for the linear relaxation problem of the vehicle routing problem.

In step S4, the solution evaluating unit 25 of the information processing apparatus 20 determines whether the difference obtained in step S3 is smaller than a predetermined threshold value. Upon finding that the difference is smaller than the predetermined threshold value, the procedure proceeds to step S8 based on the determination that the set of routes obtained in step S2 includes a sufficient number of proper routes. In step S8, the arithmetic unit 23 performs a final optimization process. Upon finding that the difference is greater than or equal to the predetermined threshold value, the procedure proceeds to step S5.

In step S5, the route removing unit 26 of the information processing apparatus 20 removes routes for which the values of variables representing the routes are less than a threshold value from the set of routes in the solution of the problem obtained by the linear relaxation of the vehicle routing problem, followed by making final the use of the routes remaining without being removed. In so doing, there may be a case in which the variables are smaller than the threshold value for all the routes generated in step S2. In such a case, only one route (i.e., the route with the largest variable value) is left to remain, and the other routes are removed. If two or more routes have the largest variable value, one of these routes may be randomly selected.

The threshold value used in step S5 may be a fixed value that is set in advance. Alternatively, the threshold value may be dynamically set to be a value that is larger the greater the difference derived in step S3. This is because the larger the difference is, the higher the degree of improperness of the routes generated in step S2 is. In such a case, it is preferable to remove routes by using stricter conditions (i.e., to remove a larger number of routes). In this manner, the criterion for removing routes may be dynamically changed in accordance with the quality of the set of routes generated in step S2, so that more appropriate routes can be generated.

In step S6, the information processing apparatus 20 removes, from the current "remaining packages", packages to be delivered by the routes the use of which has been made final, and sets the packages left remaining after the removal to "remaining packages", followed by increasing the variable representing the loop count by 1.

In step S7, the information processing apparatus 20 determines whether there are no remaining packages, or whether the loop count has reached the upper limit. Upon finding that there are no remaining packages (i.e., "remaining packages" is empty), or that the value of a variable indicative of the loop count has reached a predetermined upper limit, the procedure proceeds to step S8. Otherwise, the procedure returns to step S2, and, then, the route generation process for the "remaining packages" and the subsequent processes will be repeated.

In step S8, the information processing apparatus 20 solves the vehicle routing problem (i.e., the integer programming problem) with respect to all the routes generated by all loops, followed by outputting the obtained solution as the final output. More specifically, optimization is performed with respect to the routes that are generated by the route generating unit 21 in step S2 in each loop and that are made final by being not removed by the route removing unit 26 in step S5, and also with respect to the routes generated by the route generating unit 21 in step S2 in the last loop. The arithmetic unit 23 obtains the optimum solution of the vehicle routing problem for these routes. The output unit 24 outputs data indicative of routes constituting the optimum solution. This route data is output from the information processing apparatus 20 as the final output.

In the following, how a proper set of routes is generated by the route generation process illustrated in FIG. 4 will be described with reference to a specific example. The specific example provides a situation in which 1 kg of packages need be delivered from the delivery center to each node when there are three nodes (i.e., $D_i=1$ in the previously-noted formula (2)). The maximum load limit of each vehicle is 1.5 kg, and the cost of each vehicle is 1 (i.e., $c_r=1$ in the previously noted formula (1)). The predetermined threshold value for the difference is 1. The threshold value for the value of a variable indicative of a route is 0.9.

FIG. 14 is a drawing illustrating an example of a set of routes generated by the route generation process. In this example, the three routes illustrated in FIG. 14 are generated in step S2 of FIG. 4 in the first loop.

In step S3, the arithmetic unit 23 obtains a first optimum solution for the vehicle routing problem (i.e., the integer programming problem), and the solution evaluating unit 25 calculates the difference (i.e., differential) between the objective function value of the first optimum solution and the objective function value of a second optimum solution obtained for the linear relaxation problem of the vehicle routing problem. In the example of routes illustrated in FIG. 14, the first optimum solution includes routes R1 through R3, with the objective function value (i.e., delivery cost) being 3. The second optimum solution also includes routes R1 through R3 for which the values of respective variables $x_1$ through $x_3$ are each ⅓, with the objective function value (i.e., an approximate value of the delivery cost) being 2.

In step S4, the solution evaluating unit 25 of the information processing apparatus 20 determines whether the difference obtained in step S3 is smaller than the predetermined threshold value. In this example, the process proceeds to step S5 because the size of the difference is 1 and not less than the threshold value "1".

In step S5, the route removing unit 26 of the information processing apparatus 20 removes routes for which the values of variables representing the routes are less than a threshold value from the set of routes in the solution of the problem obtained by the linear relaxation of the vehicle routing problem, followed by making final the use of the routes remaining without being removed. In this example, the values of the variables $x_1$ through $x_3$ indicative of the routes are all equal to ⅓, which is less than the threshold value "0.9". Thus, one route (e.g., route R1) is randomly selected, and the remaining routes R2 and R3 are removed.

In step S6, the packages to be delivered by the selected route R1 are removed from the current "remaining packages", so that the resulting "remaining packages" are 0 kg, 0.5 kg, and 1 kg for nodes N1, N2, and N3. Thereafter, the procedure returns to step S2 to start a next loop. In step S2 of the next loop, a new route R4 is generated.

FIG. 15 is a drawing illustrating an example of the route R4 added by the route generation process. In step S3, the first optimum solution in the vehicle routing problem (i.e., integer programming problem) is obtained. The first optimum solution includes only the route R4, with the objective function value (i.e., delivery cost) being 1. The second optimum solution also includes only the route R4 for which the value of the corresponding variable $x_4$ is 1, with the objective function value (i.e., an approximate value of the delivery cost) being 1.

In step S4, a check is made as to whether the difference obtained in step S3 is smaller than the predetermined threshold value. Since the difference is 0, which is smaller than the threshold value "1", the procedure proceeds to step S8, and the arithmetic unit 23 performs a final optimization process. In this optimization process, the arithmetic unit 23 obtains the optimum solution of the vehicle routing problem by using in the optimization process the one or more routes that have been made final in each loop (i.e., R1 in this example) and the one or more routes that are generated in step S2 in the last loop (i.e., R4 in this example). The output unit 24 outputs data indicative of the routes (i.e., R1 and R4) constituting the optimum solution, i.e., data indicating that R1 delivers 1 kg and 0.5 kg to N1 and N2, respectively, and R4 delivers 0.5 kg and 1 kg to N2 and N3, respectively). This route data is output from the information processing apparatus 20 as the final output.

In the above-described example, the optimum solution of the vehicle routing problem is obtained by the arithmetic unit 23 with respect to a plurality of routes, and such an optimum solution includes all of the plurality of routes that have been used in optimization. This is a simple scenario used only for the sake of illustration purposes. In reality, the optimum solution of the vehicle routing problem obtained with respect to a number of routes is constituted by only some routes selected among the number of routes.

Although the route generation method of the present disclosures has heretofore been described with respect to vehicle routing problems, the route generation method of the present disclosures is not limited to vehicle routing problems. The route generation method of the present disclosures may equally be applicable to various types of problem that can be formulated as integer programming problems such as the bin packing problem. In the case of the bin-packing problem, routes in the vehicle routing problem correspond to boxes (i.e., bins, containers, or the like) in the bin packing problem. A single route for delivering packages to nodes under the condition that each node receives one package delivered thereto in the vehicle routing problem corresponds to one box into which a plurality of items are packed. In this manner, terms such as "vehicle routing problem", "package", "route", and "node" may be replaced with other terms used in other integer programming problems to formulate problems. The scope of the claims is intended to cover such problems within the equivalents thereof.

After obtaining the optimum solution for the plurality of routes generated by the route generation method according to the present disclosures, the hardware (mainly the CPU) illustrated in FIG. 2 may perform the control that delivers packages along the optimum delivery routes corresponding to the optimum solution. For example, the control operation may automatically load packages to each vehicle, without manual labor, according to the optimum solution. Alternatively, the control operation may automatically issue instructions to each driver to load packages to each vehicle according to the optimum solution. The control operation may further automatically set the navigation system of each vehicle via wireless communication so that the navigation system will guide the route for each vehicle according to the optimum solution. Alternatively, the control operation may automatically send, to the portable communication device of each driver, data that specifies the route for their vehicle according to the optimum solution. As described above, various devices may be controlled to enable delivery via the optimum delivery routes, without human intervention and/or in the manner that excludes manual labor and human decision making to the extent possible.

Use of the control operations described above enables not only the generation of a high-quality solution in a vehicle routing problem with respect to the routes generated by the route generation method of the present disclosures, but also the delivery of packages at low cost using efficient routes based on such a high-quality solution. Namely, various advantageous results are achieved such as efficient use of human resources, reduction in fuel consumption, reduction in delivery time, etc.

Further, although the present invention has been described with reference to the embodiments, the present invention is not limited to these embodiments, and various variations and modifications may be made without departing from the scope as defined in the claims.

According to at least one embodiment, proper routes for optimization purposes are generated in a vehicle routing problem.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An information processing apparatus, comprising:
a memory; and
one or more processors coupled to the memory and configured to:
generate a plurality of routes for delivering packages in a vehicle routing problem;
obtain a first optimum solution of the vehicle routing problem with respect to the plurality of routes, the first optimum solution being obtained for an integer programming problem of the vehicle routing problem, the integer programming problem being a problem in which a variable indicative of a choice of a given route in the vehicle routing problem is a binary variable having a value of 0 or 1;
obtain a second optimum solution for a linear relaxation problem of the vehicle routing problem with respect to the plurality of routes, the linear relaxation problem being a problem in which the variable indicative of a choice of a given route in the vehicle routing problem is a real number value greater than or equal to zero;
obtain a first objective function value of the first optimum solution for the integer programming problem;
obtain a second objective function value of the second optimum solution for the linear relaxation problem;
derive a difference between the first objective function value and the second objective function value;
determine whether the difference is greater than or equal to a first threshold value; and
remove, from among the plurality of routes, one or more routes for which the variable indicative of a choice of a corresponding route is less than or equal to a second threshold value in the second optimum solution, upon determining that the difference is greater than or equal to the first threshold value,
the one or more processors generate one or more new routes for delivering packages other than packages that are to be delivered by one or more routes which are left remaining, among the plurality of routes, without being removed, and
the one or more processors are further configured to obtain a third optimum solution of the vehicle routing problem with respect to routes that have been generated and left remaining without being removed, and to transmit a control operation that automatically loads packages to each vehicle according to the third optimum solution.

2. The information processing apparatus as claimed in claim 1, wherein the one or more processors are further configured to generate the plurality of routes by using column generation.

3. The information processing apparatus as claimed in claim 1, wherein obtainment of the first optimum solution with respect to a plurality of routes including the one or more new routes, obtainment of the second optimum solution and determination as to whether a new difference is greater than or equal to the first threshold value, removal of one or more routes, and generation of one or more further new routes are repeatedly performed while the new difference remains to be greater than or equal to the first threshold value.

4. The information processing apparatus as claimed in claim 1, wherein the one or more processors are further configured to obtain an optimum solution of the vehicle routing problem with respect to routes that have been generated and left remaining without being removed, upon detecting that the difference or a new difference has become less than the first threshold value.

5. The information processing apparatus as claimed in claim 1, wherein the one or more processors are further configured to retain only one route for which the variable has a largest value and to remove all other routes, upon detecting that the variable for every one of the plurality of routes is less than or equal to the second threshold value in the second optimum solution.

6. The information processing apparatus as claimed in claim 1, wherein the second threshold value is dynamically set to a value that is larger the greater the difference.

7. A computer-implemented information processing method comprising:
   generating a plurality of routes for delivering packages in a vehicle routing problem;
   obtaining a first optimum solution of the vehicle routing problem with respect to the plurality of routes, the first optimum solution being obtained for an integer programming problem of the vehicle routing problem, the integer programming problem being a problem in which a variable indicative of a choice of a given route in the vehicle routing problem is a binary variable having a value of 0 or 1;
   obtaining a second optimum solution for a linear relaxation problem of the vehicle routing problem with respect to the plurality of routes, the linear relaxation problem being a problem in which the variable indicative of a choice of a given route in the vehicle routing problem is a real number value greater than or equal to zero;
   obtaining a first objective function value of the first optimum solution for the integer programming problem;
   obtaining a second objective function value of the second optimum solution for the linear relaxation problem;
   deriving a difference between the first objective function value and the second objective function value;
   determining whether the difference is greater than or equal to a first threshold value;
   removing, among the plurality of routes, one or more routes for which the variable indicative of a choice of a corresponding route is less than or equal to a second threshold value in the second optimum solution, upon determining that the difference is greater than or equal to the first threshold value;
   generating one or more new routes for delivering packages other than packages that are to be delivered by one or more routes which are left remaining, among the plurality of routes, without being removed; and
   obtaining a third optimum solution of the vehicle routing problem with respect to routes that have been generated and left remaining without being removed, and transmitting a control operation that automatically loads packages to each vehicle according to the third optimum solution.

8. The method as claimed in claim 7 further comprising generating the plurality of routes by using column generation.

9. The method as claimed in claim 7, wherein obtainment of the first optimum solution with respect to a plurality of routes including the one or more new routes, obtainment of the second optimum solution and determination as to whether a new difference is greater than or equal to the first threshold value, removal of one or more routes, and generation of one or more further new routes are repeatedly performed while the new difference remains to be greater than or equal to the first threshold value.

10. The method as claimed in claim 7 further comprising obtaining an optimum solution of the vehicle routing problem with respect to routes that have been generated and left remaining without being removed, upon detecting that the difference or a new difference has become less than the first threshold value.

11. The method as claimed in claim 7 further comprising retaining only one route for which the variable has a largest value and to remove all other routes, upon detecting that the variable for every one of the plurality of routes is less than or equal to the second threshold value in the second optimum solution.

12. The method as claimed in claim 7, wherein the second threshold value is dynamically set to a value that is larger the greater the difference.

13. A non-transitory recording medium having a program embodied therein for causing a computer to perform:
   generating a plurality of routes for delivering packages in a vehicle routing problem;
   obtaining a first optimum solution of the vehicle routing problem with respect to the plurality of routes, the first optimum solution being obtained for an integer programming problem of the vehicle routing problem, the integer programming problem being a problem in which a variable indicative of a choice of a given route in the vehicle routing problem is a binary variable having a value of 0 or 1;
   obtaining a second optimum solution for a linear relaxation problem of the vehicle routing problem with respect to the plurality of routes, the linear relaxation problem being a problem in which the variable indicative of a choice of a given route in the vehicle routing problem is a real number value greater than or equal to zero;
   obtaining a first objective function value of the first optimum solution for the integer programming problem;
   obtaining a second objective function value of the second optimum solution for the linear relaxation problem;
   deriving a difference between the first objective function value and the second objective function value;
   determining whether the difference is greater than or equal to a first threshold value; and
   removing, among the plurality of routes, one or more routes for which the variable indicative of a choice of a corresponding route is less than or equal to a second threshold value in the second optimum solution, upon determining that the difference is greater than or equal to the first threshold value;
   generating one or more new routes for delivering packages other than packages that are to be delivered by one or more routes which are left remaining, among the plurality of routes, without being removed; and
   obtaining a third optimum solution of the vehicle routing problem with respect to routes that have been generated and left remaining without being removed, and transmitting a control operation that automatically loads packages to each vehicle according to the third optimum solution.

14. The non-transitory recording medium as claimed in claim 13 further comprising generating the plurality of routes by using column generation.

15. The non-transitory recording medium as claimed in claim 13, wherein obtainment of the first optimum solution with respect to a plurality of routes including the one or more new routes, obtainment of the second optimum solution and determination as to whether a new difference is greater than or equal to the first threshold value, removal of one or more routes, and generation of one or more further new routes are repeatedly performed while the new difference remains to be greater than or equal to the first threshold value.

16. The non-transitory recording medium as claimed in claim 13 further comprising obtaining an optimum solution of the vehicle routing problem with respect to routes that have been generated and left remaining without being removed, upon detecting that the difference or a new difference has become less than the first threshold value.

17. The non-transitory recording medium as claimed in claim 13 further comprising retaining only one route for which the variable has a largest value and to remove all other routes, upon detecting that the variable for every one of the plurality of routes is less than or equal to the second threshold value in the second optimum solution.

18. The non-transitory recording medium as claimed in claim 13, wherein the second threshold value is dynamically set to a value that is larger the greater the difference.

19. The information processing apparatus as claimed in claim 1, wherein for each of the one or more routes that are removed, the variable indicative of a choice of a corresponding route is a real number value less than or equal to the second threshold value in the second optimum solution.

* * * * *